Jan. 2, 1940.  H. R. BARRETT ET AL  2,185,325
VALVE APPARATUS FOR USE IN DISTRIBUTING FLUID
Filed May 17, 1937  2 Sheets—Sheet 1

INVENTOR
Herbert R. Barrett
Wilfrid Brookes
BY
ATTORNEY

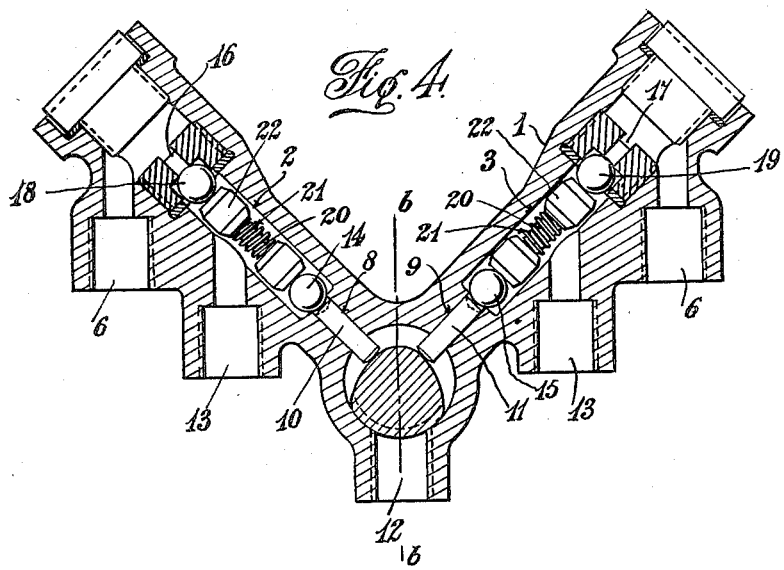
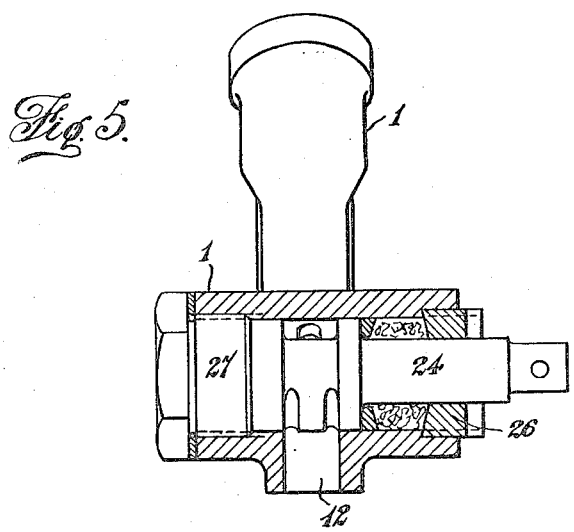

Patented Jan. 2, 1940

2,185,325

UNITED STATES PATENT OFFICE 2,185,325

VALVE APPARATUS FOR USE IN DISTRIBUTING FLUID

Herbert Raymond Barrett, Chelmsford, and Wilfrid Brookes, Braintree, England, assignors to Lake and Elliott Limited, Braintree, England, a British company Application May 17, 1937, Serial No. 143,160
In Great Britain September 9, 1936

2 Claims. (Cl. 277—21)

This invention relates to apparatus for use in distributing fluid such as oil, water, compressed air and/or gas and has for its object to provide valve apparatus by which pressure fluid in the form of oil, water, compressed air and/or gas can be distributed to one or more than one mechanism, machine, tool or container, or to a group or groups of such mechanism, machines, tools or containers or to any desired combination thereof. The invention is hereinafter described in its application to the distribution of pressure fluid such as oil or water to hydraulic jacks from which the nature of its application in general will be readily understood.

According to the present invention a fluid distributor is provided wherein means are provided to control the distribution of pressure fluid in one or more than one stream as desired to one or more than one appliance or container or to one or more than one group of appliances or containers. The pressure fluid distributor is provided with a member adapted to be rotated into a preset position and to co-operate with means which according to the preset position of the rotatable member controls the distribution of the fluid through one or more than one outlet to one or more than one appliance or container or group of appliances or containers. The aforesaid member may be rotated into any desired position of a plurality of different positions and is adapted to co-operate with valves each of which is conveniently subjected to the action of resilient means such as concentrically arranged helical springs of which the outer spring may be the weaker spring. The rotatable member aforesaid is adapted to act on the respective valve or valves through the intermediary of a cam and tappet rod in order to obtain the desired result. The rotatable member is mounted in a liquid tight casing which is provided with one or more than one inlet for fluid under pressure conveniently from a pump, with one or more than one outlet to one or more than one appliance or container, or to one or more than one group of appliances or containers and one or more than one release outlet. Obviously however there may be only one inlet for pressure fluid to the fluid distributor and one outlet therefrom and one release outlet according to requirements.

The invention will now be described with reference to the accompanying drawings in which:

Figure 4 is a vertical section of a slightly modified construction and

Figure 5 is a vertical sectional elevation taken on the line $b$—$b$ of Figure 4.

Figure 1:
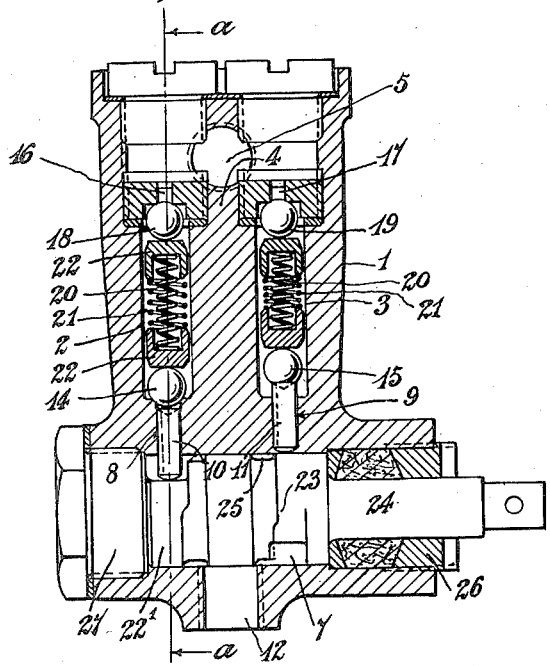
Figure 1 is a vertical sectional elevation of one form of valve apparatus constructed according to this invention.
Figure 2:
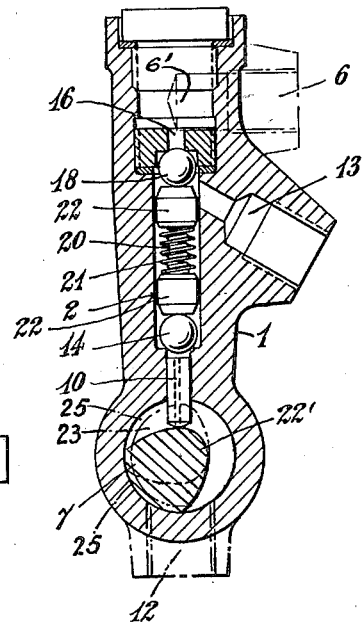
Figure 2 is a vertical section taken on the line $a$—$a$ of Figure 1, the inlet which is in front of the section being shown by dot and dash lines.
Figure 3:
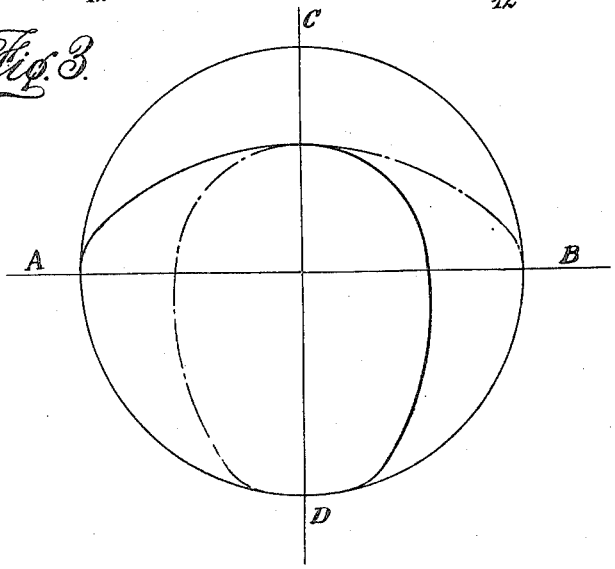
Figure 3 is an enlarged diagram of the cam operating means.

Figures 1 to 3 show by way of example valve apparatus suitable for operating hydraulic jacks where one pumping system is employed for several jacks, and the arrangement is such that fluid may be distributed to two sets of jacks individually and independently or collectively. Obviously the apparatus can be suitably modified to control one or more or two sets of jacks. The valve apparatus or fluid distributor shown comprises a casing 1 having two juxtaposed chambers 2 and 3 hereinafter termed feed chambers separated by a suitable partition 4 having an aperture 5 whereby fluid may pass into the chambers 2 and 3 from a single inlet 6 provided in the casing 1, said inlet leading to a chamber 6' at one end of the casing and hereinafter termed the supply chamber. This inlet 6 is connected in any suitable manner with a pump not shown, adapted to pump fluid from a suitable reservoir. The chambers 2 and 3 are in communication with a cam chamber 7 hereinafter termed exhaust chamber disposed in the lower portion of the casing 1 by means of passageways 8 and 9 in which are arranged tappet rods 10 and 11. These tappet rods 10 and 11 are suitably shaped or formed with flats so that fluid will pass from the chambers 2 and 3 into the chamber 7 in a manner to be hereinafter described. Leading from the chamber 7 is a release port 12 which is in communication with, for instance, the reservoir not shown, which in turn is connected to the pump. Each chamber 2 and 3 is in communication with an outlet or distribution port 13, one of which is shown in Figure 2. In the present case these ports 13 are each in communication with a lifting jack or a pair of lifting jacks. Conveniently and in the further description, it will be considered that one distribution port 13 is in communication with a pair of lifting jacks attached to the front axle of a vehicle, and that the other port 13 is in communication with a pair of jacks attached to the rear axle of a vehicle. The passageway 8 of the chamber 2 is controlled by a valve conveniently in the form of a ball 14 and the passageway 9 is also controlled in a similar manner by a ball valve 15. The upper end of the chamber 2 is formed or provided with an inlet port 16 and chamber 3 is also provided with an inlet port 17. These inlet ports 16 and 17 are controlled by valves such as ball valves 18 and 19 respectively. Thus the ports or passageways formed in each end of each of the chambers 2 and 3 are controlled by ball valves. These oppositely arranged ball valves, for instance, the ball valves 14 and 18 in the chamber 2, are spaced apart and maintained on their seatings by the action of resilient means such as concentrically arranged helical springs 20 and 21 acting on the balls 14 and 18 through the medium of cup-shaped members 22. The outer spring member 21 is of a comparative light character and is disposed concentrically around a heavier spring 20 for the purpose to be hereinafter described. It will be understood that similar spring means are provided to act on the opposite disposed balls 15 and 19 in the chamber 3, and the same references are used to denote similar parts. The tappets 10 and 11 controlling the valves in the chambers 2 and 3 are adapted to be operated through a medium of cams or the like 22' and 23 formed or provided on a shaft 24 rotatably mounted in the chamber 7. The cam shaft 24 is provided with suitable circumferential recesses or ducts 25 whereby fluid may pass from the chambers 2 and 3 into the release valve 12 when the valves are in open position. The chamber 7 containing the rotatably mounted cam shaft 24 is fitted with a stuffing gland 26 at one end and the other end is sealed by a nut member 27 so as to prevent the escape of fluid, the latter however being only under a little more than gravity pressure. Obviously valves of any convenient form may be provided to control the opposite ends of the chambers 2 and 3 and any suitable form of resilient means may be provided to press the oppositely disposed valve members outwardly on to their respective seatings to control the ports or passageways leading from the pump inlet or to the release port, and it will be understood that the fluid will circulate through the said valve apparatus by way of connecting pipes in communication with the pump and reservoir or storage cylinder or chamber. The cam shaft 24 is adapted to be operated in any suitable manner such as by manual means so as to position the cams in such positions that the jacks on the front and rear axles respectively will be operated to effect the lifting of the said axles either independently or together, or to so operate the distributor that the front jacks may be operated when the rear jacks are already operated or vice versa or to lower both axles. Fig. 3 is a diagram in which the cam 23 for operating the tappet 11 of the chamber 3 is shown in full lines and the cam 22' for operating the tappet 10 of the chamber 2 is shown in dot and dash lines. The letters A, B, C and D show four positions of the tappets in relation to these cams.

In operation, and when it is desired to operate the front axle jacks connected with the distributor port 13 of the chamber 2, the cam shaft is turned so that the cams are in the positions shown in Figs. 1 and 2. This position of the cams is also illustrated in the diagram in Fig. 3 and the position of the tappets in relation to the cams is indicated at A. In this position it will be seen that the cam 23 actuates the tappet 11 and moves the ball 15 upwardly off its seat allowing any pressure which might occur in the chamber 3 to pass by way of the passage 9 into the chamber 7 and out of the release aperture 12. The raising of the ball 15 will bring heavy pressure by means of the spring 20 on to the ball 19 and thereby maintain the aperture 17 closed so that pressure from the fluid pump can not pass through this aperture which is sealed by the ball 19 and the loading spring 20. Pressure from the pump when operated will however press upon the ball 18 in the chamber 2 and move this ball off its seating and open the aperture 16 against the action of the light spring 21. The fluid will then pass into the chamber 2 by way of the aperture 16 and to the front jacks connected with the said chamber 2 by way of the distributing duct 13 and pipe connections leading therefrom. As soon as the pressure from the pump ceases, the ball 18 will return to its seat and the aperture 16 will be sealed by the combined action of the light spring 21 and the pressure of the fluid in the jacks; the same applies to the ball 14. This position of the parts is shown in Figs. 1 and 2. When it is desired to release the pressure the cam shaft 24 is rotated and the ball 14 is lifted off its seat by the tappet rod 10 and the pressure passes by way of the passageway 8 into the cam chamber 7 and to the reservoir by way of the release aperture 12. This position of the cams in relation to the tappets is indicated at D in Fig. 3. When it is desired to operate the whole system at once, the position of the tappets in relation to the cams is indicated at C. In this position it will be seen that the tappets will be lowered and that both the ball valves 14 and 15 will be on their seatings, and that pressure from the pump when operated will press on the balls 18 and 19 and open the apertures 16 and 17 against the action of the light springs 21; the fluid will then pass into the chambers 2 and 3 and to the front and rear jacks by way of the distributing ducts 13. When pressure from the pump ceases, the ball valves 18 and 19 will return to their seatings and the apertures will be sealed by the combined action of the light springs 21 and the pressure of the fluid in the jacks; the same applies to the ball valves 14 and 15. When it is desired to release the pressure and raise the jacks, the cams are turned so that they operate the tappets at the position indicated at D in Fig. 3; that is both tappets will be raised. When the rear jacks are to be operated, the position of the tappets in relation to the cams is indicated at B in Fig. 3. In this position it will be seen that the cam 22' will be in a position to raise the tappet 10 of the chamber 2, whilst the other tappet 9 will be lowered so that the ball valve 15 will be on its seat and the pressure of the pump will operate the ball valve 19. When it is desired to lower the rear axle the cams are again turned to the all release position indicated at D. If it is desired to use, say, the rear jacks when the front jacks are already in use, by turning the cam shaft so that the position of the tappets is at C, it is possible to jack up the rear axle without disturbing the front jacking system, owing to the fact that immediately the pump action ceases the jacks are completely sealed from the pump. Assuming that the front jacks are finished with, it is possible by turning the cam shaft to the position where the tappets are indicated at B on the diagram to release the front set while maintaining the second or rear set in operation, the cam shaft being so arranged as to release one set when it is moved into pumping position for the other.

It will be realized from the foregoing description that the outer spring 21 is preferably of such a character that it is of just sufficient strength to maintain the balls 14 and 18 on their seatings but the spring 20 is of such strength that when compressed, as shown on the right hand side of Fig. 1, it will act as substantially a solid member and effectively prevent the depression of the ball 19 and the opening of this valve when the pump is operated. Obviously the inner high rated spring 20 is of such length and character that it will not interfere with the normal operation of the lighter spring 21 when the balls are fully spaced apart as shown at the left hand side of Fig. 1. It is thus to be understood that the upper valves 18 and 19 are normally held in closed position by the light springs 21 and that when so held the valves are practically beyond the influence of the heavier springs 20. The heavy spring 20 is of such character that it is not brought into operation with respect to the upper valve until the lower valve is raised by the tappet rods 10 or 11. The heavy spring is such that under the upward movement of the lower valve incident to the raising of the tappet there is a slight compression and movement of the heavy spring 20 following which this heavy spring permits practically no further compression but acts more or less in the nature of a solid member to hold the parts in position. Thus, the inner heavy spring 20 is not provided for nor capable of effecting a resistance to the opening movement of the upper valve to a position to permit the passage of the fluid under pressure. This is controlled by the lighter outer spring 21.

It will be seen by the above operation that the jacks can be completely sealed off from the pump and that it is possible to pump up either system of jacks at will without affecting the other or both at once if so desired, and to release either or all at will, the whole operation being carried out by the rotation of a single cam shaft. It will be understood that instead of the chambers 2 and 3 being arranged in juxtaposition, they may be arranged radially around the cam shaft and such an arrangement is indicated in Figs. 4 and 5. In this case the chamber 2 is arranged at an angle of 90° to the chamber 3. Obviously in this arrangement the chambers 2 and 3 will have separate inlets 6. The same reference numerals are used to indicate the corresponding parts, and the operation of this modification will be clearly understood from the previous description.

Although the valve apparatus is more particularly described in connection with distributing fluid for operating hydraulic jacks fitted to a vehicle, it will be understood that the said valve apparatus may be used for distributing any kind of fluid to other mechanisms or machine tools, or to containers, or to a group of groups of such mechanism or the like, and that the valve apparatus may have a general application.

What we claim is:

1. Valve apparatus for use in distributing fluid, comprising a casing having a chamber formed with a distribution port leading therefrom, said chamber being formed with oppositely disposed inlet and release ports, oppositely disposed valves for controlling the said ports, and resilient means acting on said oppositely disposed valves, cam means adapted to be rotated into a pre-set position to act on the valve of the release port to control the distribution of fluid, means to maintain the inlet valve closed when the release port is in open position, and means for connecting the casing with a fluid pressure supply.

2. A valve apparatus as claimed in claim 1, wherein the chamber, oppositely disposed valve seats, oppositely disposed valves, resilient means acting on said oppositely disposed valves, and the distribution port leading from each valve, are duplicated, and wherein the rotatable cam means being in duplicate to simultaneously affect one of each pair of the oppositely disposed valves, and means in duplicate to maintain the inlet valve closed when the release port is in open position.

HERBERT RAYMOND BARRETT.
WILFRID BROOKES.